(12) United States Patent
Modi

(10) Patent No.: US 11,734,525 B1
(45) Date of Patent: Aug. 22, 2023

(54) VOICE PROGRAMMABLE AUTOMATIC IDENTIFICATION AND DATA CAPTURE SYSTEM WITH REDUCED PHYSICAL TAGS

(71) Applicant: Sankalp Sandeep Modi, Acton, MA (US)

(72) Inventor: Sankalp Sandeep Modi, Acton, MA (US)

( * ) Notice: Subject to any disclaimer, the term of this patent is extended or adjusted under 35 U.S.C. 154(b) by 1 day.

(21) Appl. No.: 17/693,113

(22) Filed: Mar. 11, 2022

(51) Int. Cl.
  *G06K 7/10* (2006.01)
  *G06K 7/14* (2006.01)
(52) U.S. Cl.
  CPC ....... *G06K 7/10366* (2013.01); *G06K 7/1413* (2013.01); *G06K 7/1417* (2013.01)
(58) Field of Classification Search
  CPC .................................................. G06K 7/10366

USPC .......................................................... 235/46
See application file for complete search history.

(56) References Cited

U.S. PATENT DOCUMENTS

| 2011/0193719 | A1* | 8/2011 | Monier ................. | G01D 4/006 340/870.02 |
| 2014/0138440 | A1* | 5/2014 | D'Ambrosio ........... | G07C 9/37 235/385 |

* cited by examiner

*Primary Examiner* — Toan C Ly

(57) ABSTRACT

The proposed invention significantly reduces, simplifies, or removes the need for physical tags by generating virtual identification tags for full or partial identification of the individual storage item that can be tracked and managed in voice-enabled Automatic Identification and Data Capture (AIDC) systems. Specifically, it utilizes multiple sensors to observe different characteristics of storage items and intelligently guides the user to selectively modify or add characteristics to the storage item for improving identification without the need for AIDC tags on every item.

20 Claims, 1 Drawing Sheet

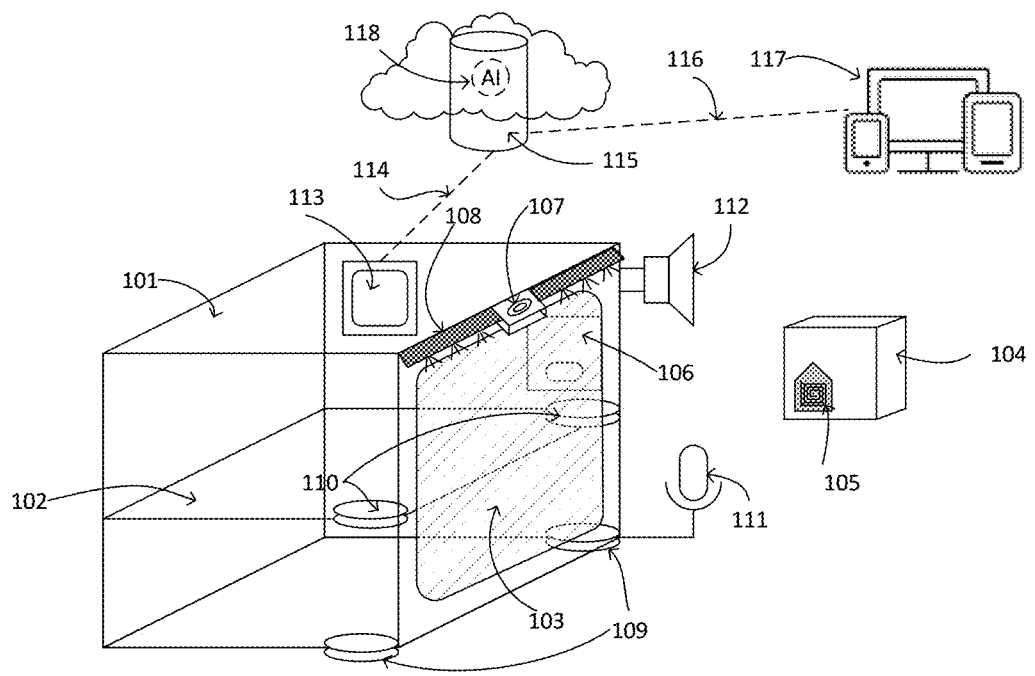

VOICE PROGRAMMABLE AUTOMATIC IDENTIFICATION AND DATA CAPTURE SYSTEM WITH REDUCED PHYSICAL TAGS

1 BACKGROUND

Automatic identification and data capture (AIDC) refers to the methods of automatically identifying objects, collecting data about them, and entering that data directly into computer systems (i.e. without human involvement). AIDC technologies include barcodes, RFID, book des, OCR, magnetic stripes, smart cards, and biometrics (like iris and facial recognition systems). AIDC system typically consists of AIDC tags and AIDC sensors connected to processing units.

AIDC systems have been used in commercial systems extensively for inventory management and logistic tracking. However, it has not got much traction in the consumer market in home settings. One of the main hurdles for adopting such a system for such a setting is the cost of programming and maintaining the AIDC system using data entry for various items. For AIDC systems to be useful, generally, each AIDC tag must be associated with some useful data at least once (such as what that AIDC tag is attached to). Such data is typically entered using data entry in an electronic form. Moreover, over time, such associated data is augmented, modified, removed, or rewritten, which also requires additional data entry work. Even when data is available in an electronic form, association/modification of that data to AIDC tag with the correct configuration can be complicated. Such tasks, as well as electronic data entry, are typically time-consuming and inconvenient which require significant time, effort, and technical know-how by the user. Without the economy of scale, the cost and inconvenience of such tasks frequently outweigh the advantages of using the AIDC system. For the same reasons, AIDC systems have not been successful in small businesses or developing countries, as the overhead and cost of implementing such systems eclipse the benefits.

Invention proposed in U.S. Pat. No. 9,996,819B1 significantly lowers the burden of electronics data entry, as well as maintenance and configuration of the system, by making it programmable by voice and using artificial intelligence. Specifically, it proposes an AIDC sensor-equipped storage container and AIDC system which can track items equipped with one or more AIDC tags, and any data can be associated, augmented, modified, removed, or rewritten by using voice interaction by a user.

The AIDC tags in U.S. Pat. No. 9,996,819B1 may be a physical tag or a virtual ID tag. However, U.S. Pat. No. 9,996,819B1 does not describe any methods to minimize the need for physical tags. Reducing physical tag not only reduces the cost of the tag but also reduces the labor/automation costs for attaching a physical tag to the item.

2 PROPOSED INVENTION

The invention presented here proposes a system and methods to (1) reduce, simplify or remove the need for physical AIDC tags by generating virtual ID tags for full or partial identification of the individual storage item and (2) making it programmable by voice and artificial intelligence.

2.1 DESCRIPTION

Attached FIG. 1 presents the proposed voice programmable AIDC system with virtual ID tags.

101 is a storage container where physical items are stored and retrieved by the user. Such a storage container may be of any size (small box, large warehouse). It may be stationary or mobile (e.g. enclosed container in a truck). It may provide additional services apart from storage, e.g. refrigeration.

102 is a section of the container that divides containers into separate sections (e.g., a shelf in a cabinet). Such a section may be physical or logical.

103 (plane with the gray diagonal pattern in FIG. 1) is the plane of opening/accessing the container. Storage items can only move in and out of the container by crossing the plane. Container may have more than one opening/access plane. For simplicity and brevity, the document describes operations with only one opening, however, the presented technique can be extended to multiple openings by implementing a plane crossing detection mechanism for all opening/access planes.

104 represents any physical storage item that a user wishes to store and retrieve from the container.

105 is an optional assistive marking/s added to the container by the user. When the AIDC system is unable to uniquely identify and track certain storage items based on their characteristics (detected by primary and auxiliary sensors) such marking/s are added by the user upon AIDC system request as a fallback mechanism. Such a marking may be an adhesive label (displaying text or shapes of varieties of colors), a physical AIDC tag (barcode, QR code, or RFID tag), or paint/dye of specific pattern/colors.

106 is an optional AIDC sensor that can detect and identify a physical AIDC tag. Such detection may require a special user action (such as bringing the physical AIDC tag near to sensors) or it may happen without any special action from the user (e.g. just passing the physical AIDC tag from the opening.) One or more AIDC sensors may be used for one container. Conversely, one AIDC sensor may be shared between different containers. Additionally, such AIDC sensors may be mounted on/integrated into the container or they may be separate and kept nearby the container opening.

107 is the primary sensor for automatic detection and identification of a storage item. (e.g. camera). Such a sensor may use on multiple characteristics of the storage item (e.g. shape, color, size, text on the surface, etc.) to differentiate and identify different storage items. Information from other sensors may be combined with the information from the primary sensor to improve detection and identification. One or more primary sensors may be used for the same container; conversely, one sensor may monitor more than one storage container.

108,109,110 are optional auxiliary sensors for capturing additional information about the storage item that is not available to primary sensors. (e.g. Time of flight camera, weight sensors in the shelf, Light Detection and Ranging (LIDAR), pressure-sensitive mat on selves, optical obstacle detector, Passive Infrared motion sensors (PIR), proximity sensors, light detector, etc.). Such sensors may detect (a) a storage item crossing the access plane and/or addition/subtraction of storage item in the container (b) more granular information about the location of the storage item within the container (e.g. which shelf the storage item is placed.) and/or (c) other characteristics of the items such as weight and dimensions, etc. One or more auxiliary sensors may be used for the same container; conversely, one auxiliary sensor may monitor more than one storage container.

In some configurations, some of the functions of the auxiliary sensors may be performed by the primary sensors.

The information sensed by any of the sensors about the item is considered the observed characteristics of the item. An observed characteristic may be some sort of a numerical measurement (weight, luminance, etc.) or it may be an observation that is non-numerical in nature (e.g. shape).

111 is a microphone that is used by the user to provide information to the AIDC system. 112 is a speaker that the AIDC system utilizes to inform and inquire the user.

111 and 112 may be integrated into (or mounted on) container or they may be separate (e.g. in a user's mobile phone)

113 is a processor unit that is connected (either wired or wirelessly) to the primary sensor (105), the AIDC sensor (106), auxiliary sensors (107-110), microphone (111), and speaker (112). The processor unit is able to read and command connected components. 113 may be integrated into (or mounted on) container or it may be separate (e.g. in a user's mobile phone).

Processor unit 113 is connected vial link 114 to a network-connected server (e.g. cloud server) 115. This server may contain a database to keep track of the storage items (104) in one or more containers (101).

Moreover, servers (115) may store and execute Artificial Intelligence (AI) module (118). Such AI modules may possess capabilities of multiple relevant domains, including but not limited to, audio processing, speech recognition, natural language processing, machine learning, expert systems, and user behavior prediction for inventory management. Optionally, all or a part of the AI module (118) may be stored and executed on the processing unit (113) or end-user computing devices (117).

Server (115) is connected to end-user computing devices 117 (e.g. Mobile phone or PC) via link 116, which enables 117 to view and modify data or configuration of the proposed AIDC system. An end-user computing device (117) may be mounted on the container (101) itself, such as a touch screen display.

Each storage item (104) may be associated with "title information" (e.g. name, identification number, category, or ingredient.) which helps users to recognize the storage item, type of the storage item, or content of the storage item. Apart from the title information, a storage item may be associated with metadata that provides additional information (e.g. expiry date, quantity, intended use, the target user information, notes, assistive tag information, etc.). Content and components of such title information and metadata are customizable by the user.

2.2 OPERATION

When a user adds or removes a storage item (104) through the opening (103) inside/outside of the container (101), such event is detected using information from the primary (107) and/or other sensors (106,108-110) processed by processing unit (113). In some cases, the processing and detection are assisted by the networked server (115) using the information conveyed through the link (114).

Upon detection of an event when an item is added to the container, the AIDC system attempts to uniquely identify the storage item (104) amongst the storage items already stored within the container (or within a specific section (102) of the container, e.g. a specific shelf) using data from primary, AIDC and auxiliary sensors.

If the storage item can be uniquely identified/differentiated amongst the storage items already stored within the container (or within a specific section of the container) with high confidence, the AIDC system creates and stores an identifying digital signature for the storage item based on it characteristics, including but not limited to, shape, color, size, text on the surface, weight, location/section, etc. Such a digital signature is used as the virtual ID tag for the storage item. The measured characteristic may be of the whole item or a portion/view of the item. For example, shape or size may be measured from a certain view of the item, (e.g. top view). Moreover, such characteristics may be inherent to the storage item or it may be due to existing assistive markings (105) on the storage item.

If the storage item cannot be uniquely identified/differentiated amongst the storage items already stored within the container (or within a specific section of the container, e.g. a specific shelf) with high confidence, then the AIDC system asks the user via speaker (112) (or via end-user computing devices (117)) to add one or more assistive markings (105) to the storage item (104), which may add characteristics to the storage item (or alter the characteristics of the storage item) that enables a unique identification of the storage item. Such added/altered characteristics are captured by primary, AIDC, or auxiliary sensors and combined with other existing characteristics of the storage item to form a virtual ID tag that is unique amongst the other virtual IDs tags in the container (or a specific section of the container.)

The AIDC system keeps track of the movement of the storage items and their associated virtual ID tags. Therefore, the AIDC system is aware of which virtual ID tags are associated with items that are currently inside the container (or a section of the container).

Upon detection of an event when an item is removed from the container, the AIDC system calculates its digital signature (using observed and measured characteristics of the storage item) and match it to the digital signature of one of the virtual ID tags for items inside the container (or the container section). Upon completion of the response to the removal action, the matched virtual ID tag is now marked as outside of the container (or the container section).

The AIDC system maintains an appropriate history of locations and movements of the storage items (their virtual ID tags and other metadata) as well as the current state of the items and their respective associated metadata.

The AIDC system operates on contextual information exchange. When an item is detected going inside or outside of the storage container (101) and is uniquely identified with a virtual ID tag, the current context is set to the detected virtual ID tag and information passed to/from the user using speech/audio it regarding the storage item (104) is associated with the detected virtual ID tag, (unless explicitly requested by the user otherwise). Similarly, any information obtained using sensors (105-110) is automatically associated with the detected virtual ID tag. This kind of contextual processing is one of the key parts to increase the user-friendliness of the proposed invention.

Any speech input from a user, provided via microphone (111), is transmitted to the processing unit (113) for processing and recognition. The processing unit (113) may further send the speech (or the processed information about the speech, or both) to the networked server for interpreting and understanding the speech input. After recognizing the speech, the AI module determines and executes the appropriate action (such as updating inventory in a database). Additionally, the AI module may inform the user about the action taken or ask for more information via the speaker (113).

At the time of addition/removal, if any title information is available, the AIDC system may announce the title information to the user via speaker (112). In response, the user may ask for adding or modifying the title information and any associated metadata data by speaking into the microphone (111).

Moreover, for each entry and exit of a storage item, the processing unit (113) receives data about the entry/exit event, detected virtual ID tag, event timing, title information, metadata, and information provided by auxiliary sensors. This data is passed to the networked server (115) and it is processed, analyzed, and stored by the AI module (118) in the network server (115). Alternatively, some or all of such processing and analysis may be performed in the processing unit (113).

Processing of this raw data by AI combined with information from external sources (such as the internet) may generate, a number of useful derived information and metadata regarding the storage item (e.g., creation of reminder for removal of a storage item). Moreover, the history of the raw data, the derived information, and calculated statistics may be maintained in the server (115), which may be used for AI for machine learning. Data stored on the server is made available to the end-user devices using a software application (e.g. App on a mobile phone).

2.2.1 Example Workflow

As an example, suppose the system observes an item with a 4-inch diameter with a top yellow cover through a camera. The first time when the user is putting such an item inside, the system knows there is nothing like this inside and the system has not seen something like this before; hence the system generates a new VID tag T-123. The user says they have "Creamy Sause" in it.

When the user takes it out, the system knows that it is going out and must match with one of the items previously put inside. Here, the observed characteristic matches closely with the characteristics associated with T-123. Therefore, instead of generating a new tag, the system identifies it as T-123.

Then the user puts the same item back again, the system knows that the item is going in. There is nothing like that inside, so it can be uniquely identified relative to other items already inside; but the system has seen this before and looks like T-123, so the system maps it to T-123 instead of generating a new tag ID. The system informs users about its title "Creamy Sause" and the user can correct the system if the user wants.

Now, if the user puts another item in with a 4-inch diameter top yellow cover, it looks like T-123 to the system that is already in the fridge. Here, the system cannot distinguish between the one inside and another one coming in. At this point, the system asks the user to add a red sticker to it so the system can distinguish it from the one inside. When the user tries to put it back again with the sticker on, the system generates a new VID tag T-124.

2.3 TECHNIQUES TO GENERATE VIRTUAL ID TAGS 2.3.1 Utilizing Sections and Positions The position of the storage item within the container can be sensed with different levels of granularity depending upon the sensors. For instance, if the container has weight sensors embedded in each of its shelves, then the position can be sensed within the granularity of the shelf.

When the storage item is placed in the container, typically position within the container does not change without taking it out or intentionally moving it inside. Until then, it becomes a piece of invariant information for the storage item. This allows the AIDC system to use this position as part of the information to uniquely identify this item, even though this position is not an inherent characteristic of the storage item.

In other words, once the AIDC system knows which shelf was used to place the item, the AIDC system only needs to differentiate it from other items on that particular shelf (based on its other characteristics i.e. shape, size, color, etc.)

Similarly, the content and weight of the storage does not change without taking it out and can be used as part of the identifying information.

When the user takes an item out and puts it back, its position and weight might have changed. In such a case, the AIDC system may present the best guess to the user about the storage item and may ask for confirmation, and the user may override the title information (or any other information) that the user deems appropriate.

In one of the embodiments of the invention, the color camera is placed on top of the access opening as the primary sensor. A number of the types of auxiliary sensors may be used to estimate the position of the storage item going in or out of the access opening, either alone or in some combination with other sensors.

(1) Arrays of ToF (time-of-flight) sensors on the top and/or side of the opening
(2) Weight sensors under each shelf
(3) Pressure sensitive mats capable of detecting different weights on a different area of the mat (provides location granularity finer than a shelf)

2.3.2 Assistive Markings

Whenever the storage item cannot be uniquely identified/differentiated with high confidence without any additional assistive markings, then the AIDC system asks the user to add assistive markings (105) to the storage item which may add (or alter) characteristics to the storage item. Such added/altered characteristics are captured by one of the primary or auxiliary sensors and combined with other available characteristics to form a uniquely indefinable virtual ID tag.

In some of the embodiments of the invention, such markings (105) may be self-contained AIDC tags or labels (e.g. barcode, QR code, RFID, etc.), which may be read and uniquely identified using an AIDC sensor without the need of any other characteristic of the item. When such a self-contained physical AIDC tag is used as an assistive marking, the virtual ID tag is considered the same as the physically attached AIDC tag.

In yet another embodiment of the invention, such assistive markings (105) may be one or more adhesive 'assistive' labels (e.g. label displaying a red triangle with yellow background, multi-colored stickers with multiple shapes/text like one yellow and one green circle, or one red square and one blue triangle, etc.) that add/alter characteristics to the storage item such that it can assist the AIDC system to uniquely identified/differentiate the storage item amongst the storage items already stored within the container (or within a specific section of the container) using primary and/or auxiliary sensors to form a unique virtual ID tag. Since the AIDC system already knows the characteristic of the items already stored within the container (or within a specific location within the container), the AIDC system instructs the user to select appropriate assistive markings using the pre-supplied set of assistive labels. Compared to self-contained physical AIDC tags, assistive labels may provide one or more benefits, including but not limited to, reduced costs, faster speed of operation, being aesthetically more pleasing, being more compact, etc.

In yet another embodiment of the invention, such assistive marking (105) may be one or more shapes and/or text created using colored markers that add/alter characteristics to the storage item (e.g. two red dots, one green, and one red dot, number 5 written in blue ink, etc.) such that it can assist the AIDC system to uniquely identified/differentiate the storage item (104) amongst the storage items already stored within the container (or within a specific section of the container) using primary and/or auxiliary sensors to form a unique virtual ID tag. Since the AIDC system already knows the characteristic of the items already stored within the container (or within a specific section of the container), the AIDC system instructs the user to create an appropriate assistive marking (e.g. "create two green dots on the top"). The assistive marking may be made using pre-supplied marker pens. The marking may or may not be visible to the user's eyes. For example, the user may be instructed to mark the storage item using a pre-supplied marker containing invisible ultraviolet (UV) ink.

In yet another embodiment of the invention, such markings may be made by spraying colors/dye in specific shapes or patterns, or by scratching the surface of the storage item, or by dinging and modifying the shape of the item. The idea is to add/modify characteristics of the storage item such that it can be uniquely identified amongst other items in a certain section of the storage container. The AIDC system may provide explicit instruction for the user on how to create such markings or the system has the means to produce such markings for the user (e.g. printing a label on-demand, automatically spraying color on the item, etc.)

2.3.3 Reusing Virtual ID Tags and SMARt Matching

The AIDC system does not necessarily create a new virtual ID tag every time an item is added to the container. If the item being added has closely matching characteristics and digital signature to the item identified before, then, instead of creating a new virtual ID tag, it may be mapped to the previously observed virtual ID tag and will be recognized as such.

As an example, when the user puts in a cylindrical Tupperware (5 centimeters of radius and red lid) the first time, a new virtual ID tag (e.g. VIDT-0311) with a digital signature is created, and the location of that tag VIDT-0311 is registered as inside. When you take it out, the AIDC system recognizes that this cylindrical Tupperware (5 centimeters of radius and red lid) is the same as one associated with tag VIDT-0311. The location of that tag VIDT-0311 is marked as outside. When the user puts back the same item, instead of creating a new virtual ID tag, the same virtual ID tag VIDT-0311 is used.

Many times there could be some differences in generating digital signatures for the same item, due to human or environmental factors. For example, if the user takes in/out the same item at a different angle, the sensors may record a different shape, hence the different signature. Similarly, the lighting conditions can cause the sensors to read different colors for the same item. Conversely, those human and environmental factors may also cause to generate a false matching.

In order to minimize such false matches and mismatches, the AIDC system may use a smart and fuzzy digital signature matching using AI that considers multiple factors for matching including, history, patterns of movement, domain knowledge, and continuous learning based on user corrections and feedback.

2.4 A TECHNIQUES TO IMPROVE USABILITY AND OPERATIONS WITH VOICE INPUTS (1) The current speech recognition systems have limited accuracy, particularly when it comes to special names which are not part of a language dictionary. In the case of inventory management, such names frequently carry significant and crucial information. E.g. name of medicine, ethnic food items name, etc. The challenge is compounded when such names are pronounced by different users with widely varying accents. The proposed invention utilizes a number of techniques to alleviate the problem and make the AIDC system more user-friendly.

(2) Storing, differentiating, and utilizing original speech segment: Irrespective of how well the user speech segment is recognized, the original speech segment may also be stored with associated virtual ID tag and replayed to the user when needed. For example, the name of the storage item will be read back to the user in the user's voice. Here the storage item can be identified and searched using the characteristics of the sound of its title information (a.k.a. sound signature) rather than the recognized name. This way, even if the name is not recognized properly, many of the inventory management functions can work, as long as the 'sound signature' of the title information is distinguishable compared to the sound signature of the other storage items in the storage container. This is particularly important when the AIDC system encounters names missing from standard vocabulary e.g. ethnic food name "aalo-gobhi".

(3) Interactive mode with immediate feedback: AI module (118) may ask for clarification to the user if AI is not able to understand (or have ambiguity regarding) a part or the whole of the speech input provided by the user. Moreover, the AI module may selectively convey back recognized segments of the speech (or information derived from it) for confirmation. Such information is also immediately made available to end-user computing devices (117) for visual confirmation. The user is able to correct any misrecognized/incorrect information through new voice commands or interacting with any end-user computing devices. The contextual nature of the interaction makes these actions more user-palatable.

(4) Narrow domain and adaptive AI: Unlike general speech processing, (e.g. dictation), interaction about the storage management and related activities requires a much smaller set of options and vocabulary. Moreover, depending upon the application of the storage, this vocabulary can be narrowed even further. For example, working with kitchen refrigeration, drug storage, and filing cabinet is likely to have different distinct vocabularies and/or sentence structures; and the AI module may avail the knowledge about the application to improve speech recognition. Furthermore, AI may utilize the history of user actions/correction for deep learning and adaptive user action prediction to improve speech recognition and other functionality by mapping it to application-specific and user-specific actions.

(5) Limited language patterns and keywords/key phrases: To improve operations for certain applications, the proposed AIDC system may restrict acceptable user input to certain language patterns (e.g. all user inputs must be imperative sentences.) Moreover, AIDC system instruction may provide the user a list of certain limited keywords/or key phrases for performing specific actions or conveying specific information (e.g. "Reminders after 3 days", "Expires on").

(6) Only relevant and unobtrusive feedback through adaptive AI: One of the most important usability aspects of the proposed AIDC system is that the system provides only relevant and timely feedback and information, through adaptive learning in AI. Some examples are: (a) if a user asks the same type of question about metadata repeatedly for a particular type of storage item, next time when such storage item entry/exit is detected the AIDC system provides that information without the user asking for it (2) When a user cuts off the additional information being provided by the AIDC system, particularly with some key phrases like "yeah, that's enough", next time information will be curtailed for the storage item. (The AIDC system continues to listen to the user even while providing the information through the speaker.) (c) AI attempts to detect the distinct mode of operation and predict operation/behavior based on all information available. For instance, when a significant number of storage items is rapidly exiting/entering the AIDC system, the user may be performing restocking in bulk and the user may not be interested in hearing metadata or even title information for all storage items. The AI system may learn from one user or by combining multiple user data from cloud services.

(7) Interactive and configurable through end-user computing devices: all system settings and data may be made available through applications on end-user computing devices with user familiar interfaces, instead of cramped, inflexible, and unappealing user-interface mounted generally on the storage container.

(8) Use of metadata to provide other internet-connected services: Since a user can attach any metadata easily with any virtual ID tag, it creates a rich platform for providing a number of other internet-connected services, based on metadata, such as emails notification, calendar event, producing shopping list, ordering low stock storage item, etc.

(9) Many products come with an inbuilt physical AIDC tag, e.g. UPC barcode. With a barcode reader, the proposed AIDC system can look up the UPC barcode and fetch the related data, if available, and announce it to the user. The user can augment or modify the data. More importantly, in the case where the barcode is unrecognized, the user can instruct the AIDC system what it is. The AIDC system learns and remembers the information associated with the barcode. Next time when the same barcode is detected, the AIDC system will recognize it and announce the associated information.

3 SPECIFIC APPLICATION—CONTENT-AWARE SMART KITCHEN REFRIGERATOR

One of the very useful applications for the proposed system is for making smart kitchen refrigerators. The current issue with the so-called "smart" refrigerator (a.k.a. fridge) in the market is that it does not have a very user-friendly, general, and robust system to make it content-aware. The typical current techniques used for detecting contents are:

(1) Use of cameras to read the text/brand labels for storage items: this method is not robust or user-friendly because (a) it is difficult to get a clear shot of labels in the congested fridge. (b) The user's hands may be blocking the view. (c) You may need many cameras from a different angle to overcome (b), making the system very costly (d) Optical character recognition technology is not robust to recognize the content, particularly, when the image is captured from a video frame of a moving object. (e) Cannot detect content in user utensils (e.g. leftovers or cooked items) that are not labeled. Not only adding a written label for each of the utensils is cumbersome, but the same utensils may also be reused with different content which requires removing the previous labeling and relabeling them. (f) If the user has to add any metadata, they have to manually type the information in some input devices.

(2) Use barcode reader: this method is inconvenient and limited because: (a) there is no universal barcode system with an associated database. Each shopping store or manufacturer may have its own barcode system. Hence, even after reading the barcode on the product, that bar code may not be correctly recognized. (b) Range of the barcode reader is limited, and the barcode of the product must be brought nearer to the reader, facing the reader. Performing this special action every time putting or taking away each item from the fridge is cumbersome. Limitation of (1) (e-f) also applies.

The proposed solution is to adopt the system described in Section 2 as follows:
1. Fridge as storage container (101)
2. The shelf in the fridge as a section of the container (102)
3. The door of the fridge as the plane of opening/access (103)
4. Any storage item (box/bottle/utensil) for the fridge is a storage item (104)
5. Labels containing different shapes of different colors as assistive markings (105). Labels should be easily attachable and removable for any container, like reusable stickers
6. Color camera as the primary sensor (107)
7. An array of ToF (time-of-flight) sensors to monitor items going in and out of the door (108).
8. Weight sensors under each shelf are auxiliary sensors (109,110). Not only such weight sensors can identify entry and exit events by monitoring weight change, but they can also provide weight information about the identified storage items.
9. Microphone (111) and speaker (112) are embedded in (or attached to) the fridge door opening.
10. The processing unit is an embedded processor (113) that is connected to the internet and sensors. It is connected to Server (115) running AI module (118) through the internet.
11. Mobile phones, tablets, or PC are end-user devices (117), which access server data through special apps.

Detection of a storage item going in or out of the fridge is indicated by distinct short sounds on the speaker like "Beep" or "Ding". Title information of the storage item will be provided by the user which will be typically the name of the content in the storage item.

3.1 OPERATION

When a user opens the door of such fridge and puts in (or takes away) any storage item that can be identified using a virtual ID tag in the fridge, the fridge detects it with a "Ding" sound. If no storage item name is associated with the virtual ID tag, the fridge may ask the user (through voice on speaker), to identify the storage item. The user may provide the name of the storage item along with any metadata by speaking through the microphone.

If the virtual ID tag has an associated storage item title/name from its last use, the fridge may announce the title/name (along with any information deems pertinent by the AI module and system configuration). The user may override the name and/or add/override metadata data by speaking new name/metadata. An example of such metadata and related system action is provided in a sample scenario described in section 3.1.1.

If the system is unable to create or detect its virtual ID tag (i.e. unable to differentiate and uniquely identify the item compared to other items already in the fridge) based on the existing characteristics of the item, then the system may request the user via speakers to add certain assistive labels on the storage item and put it in again.

Announcement of the name and some metadata may be performed by either replaying the recorded user voice and/or using text to speech synthesis about the stored data.

3.1.1 Sample Usage Scenario:

[Scene] User Julia came home after light grocery shopping and wishes to add some of the shopped items in the fridge while also reviewing the existing content of the fridge. The user interacts with the fridge using the microphone and speakers. Any update in content detected by the fridge is conveyed to the connected cloud server. For simplicity, the entire AIDC system will be referred to as the fridge in this scenario, because that is what the user perceives.

Julia opens the fridge door.

[Fridge]: "Welcome back." Here, it is a greeting message.

[Julia:]: "Hello, Alice. Julia here." Here, Alice is the user-given name of this fridge. Julia indemnifies herself as the user. This puts the smart fridge in the context of the user Julia.

Julia grabs a green translucent plastic bag of tomatoes and puts that bag in the fridge. As the tomato bag is crossing the door, the fridge detects a new item going in (based on image processing on the camera) and plays the "Ding" sound.

[Julia:] "Tomatoes." The fridge is able to differentiate the item compared to other items in the fridge based on its color and location (bottom compartment) because there is currently no other green translucent bag in that compartment. The fridge creates a virtual ID tag for the item; associates it with title/Name "tomatoes" and registers its weight using the difference in weight registered by weight sensors.

Julia takes a milk carton from the shopping bag and puts the item in the fridge. As the milk carton is crossing the door, the fridge detects a new item going in, plays a "Ding" sound. The fridge is able to uniquely identify the item because of the shape and color of the top view of the carton captured by the camera on the top of the fridge.

[Julia:] "Milk. Expires in two weeks." Here, metadata is being added in natural language. The fridge registers the item name and the weight with the virtual ID tag and also adds the expiry date for the item.

This expiry date can be used for multiple purposes, like creating a reminder or viewing items by expiry date in the mobile app, etc. If Julia did not add the expiry date, the fridge will still estimate the expiry date based on cloud analytics.

Julia added an item in a transparent plastic box but forgot to say the name. The sensors detected the item going in and the fridge was able to uniquely identify the box due to its size and color; the fridge generates an appropriate virtual ID tag for the box and then inquired a question to the user via the speaker.

[Fridge:]: "That's new, what is it?" This is a feedback/question in natural language by the fridge.

[Julia:] "They are peaches". The fridge is still in the context of the last detected virtual ID tag. Hence, its name and weight are added to the information associated with the virtual ID tag.

Julia takes out a container to make space. The fridge detects the outgoing object using its observed characteristic, (including shapes and color displayed on its assistive labels) matching with a stored virtual ID tag and played "Ding" and based on the last stored information, announces

[Fridge:] "Soup."

Julia takes out the container. The fridge recognizes it (using observed characteristic matching a stored virtual ID tag) and plays "Ding" and announces

[Fridge:] "Blueberries."

[Julia:] "Discard this".

[Fridge:] "OK. Discarded" Fridge resets any information associated with that virtual ID tag. Moreover, it registers the waste item with its weight. This is used for maintaining waste statistics and history.

Julia adds another long plastic bag. There is no other bag of that size and shape on that shelf, so the fridge generates a virtual ID tag based on its shape and size.

[Julia:] "Red papers. Add a note: this is for Friday dinner." The fridge registers the name and its weight and associate record for that virtual ID tag. Moreover, metadata is used for the meal planning app.

Julia takes out some soup that was outside, pours some of it in another bowl, and puts back the soup bowl. The fridge recognizes with "Ding" and announces "Soup." Weight change will be noted to register the consumption of soup from the container.

Julia puts a box of pasta in a container that looks very similar to another item in the fridge from the camera.

[Fridge:] "This item looks very similar to other items in the fridge. Can you take it out and attach a yellow triangle sticker on top of it?"

Julia takes it out, adds a yellow triangle sticker on it, and puts it back.

[Julia:] "Pasta. Remind me to finish by tomorrow evening."

[Fridge:] "OK." Name and weight are added to the information associated with that virtual ID tag and a reminder is created for tomorrow evening.

Julia puts a container that was previously used to contain "Oatmeal" but now contains Lasagna. The fridge recognizes the old virtual ID tag.

[Fridge:] "Ding! Oatmeal."

[Julia:] "No, it's Lasagna now."

[Fridge:] "OK, updated." Information associated with the virtual ID tag is updated.

Julia closes the fridge.

[Fridge:] "Wait, you have expired hummus on the top shelf and stale raspberry on the bottom shelf." Here, the AI module decides to volunteer some pertinent information.

Julia takes out the hummus. Fridge recognizes it by matching characteristics with a stored virtual ID tag with a "Ding" sound and announces "Hummus."

[Julia:] "Discard this."

[Fridge:] "OK, discarded"

Julia takes out raspberries. Fridge recognizes it by matching characteristics with a stored virtual ID tag with a "Ding" sound and announces "Raspberries".

Julia examines raspberries and puts them back in the fridge. Fridge recognizes it with "Ding" and announces "Raspberries".

[Julia:] "These are still good for two days. Remind me to take to office tomorrow."

[Fridge:] "OK, updated." The fridge updates the expiry date for the virtual ID tag and creates a reminder service. Here information associated with the virtual ID tag is reprogrammed on the fly using voice commands.

4 SPECIFIC APPLICATIONS—MEDICINE CABINETS

Here, the medicine cabinet is the storage container, medical supplies (bottles, strips, etc.) are storage items. Items can be attached with assistive labels as needed. A camera detects the movement of the item going in and out of the cabinet. Microphone and speaker are embedded in (or attached to) the cabinet.

Similar to the operation described in section 3.1, the user will pronounce the name of the item and other associated useful information (expiry, quantity, purpose, dosage) when putting in the item the first time. From then on, the AIDC system will announce existing information while taking out or putting the item with the same virtual ID tag and the user can modify the information through voice input if needed.

All the information stored in the AIDC system is accessible via user devices like mobile phones or tablets via internet-connected servers.

Both small hospitals and home medicine cabinets can benefit from this invention. Every year, millions of dollars of medicine are expired and wasted all around the world in home cabinets or small hospitals due to a lack of an easy-to-use cost-effective inventory system. With internet-connected medical cabinets, effective medicine donation programs can be set up to reduce this waste. Moreover, data related to consumer medicine usage and patterns are very valuable for consumer research and medical research alike.

5 EMBODIMENT OF THE COMPUTING SYSTEM AND SOFTWARE

Embodiments of the invention may be implemented on a computing system. Any combination of mobile, desktop, server, router, switch, embedded device, or other types of hardware may be used. For example, a computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, an infrared interface, network interface, optical interface, etc.), and numerous other elements and functionalities.

The computer processor(s) may be an integrated circuit for processing instructions. For example, the computer processor(s) may be one or more cores or micro-cores of a processor. The computing system may also include one or more input devices, such as a touchscreen, keyboard, mouse, microphone, touchpad, electronic pen, or any other type of input device.

The communication interface may include an integrated circuit for connecting the computing system to a network (e.g., a local area network (LAN), a wide area network (WAN) such as the Internet, mobile network, or any other type of network) and/or to another device, such as another computing device.

Software instructions in the form of the computer-readable program code to perform embodiments of the invention may be stored, in whole or in part, temporarily or permanently, on a non-transitory computer-readable medium such as a CD, DVD, storage device, a diskette, a tape, flash memory, physical memory, or any other computer-readable storage medium. Specifically, the software instructions may correspond to computer-readable program code that, when executed by a processor(s), is configured to perform one or more embodiments of the invention.

The invention claimed is:

1. A method for identifying a storage item stored in a container based on a virtual identifying tag comprising:
   receiving the storage item at an access plane of the container;
   determining whether the storage item is uniquely identifiable based on the characteristics observed of at least a portion of the storage item by one or more sensors in the container, and a plurality of other items in the container;
   when the storage item is uniquely identifiable, determining whether observed characteristics, including added or altered characteristics by the user, can be mapped to one of the previously generated virtual identification tags;
   when it cannot be mapped to any previously generated virtual identification tag, generating a new virtual identifying tag that uniquely identifies the storage item; and
   when the storage item is not uniquely identifiable:
   prompting the user to alter the characteristics of the storage item or add characteristics to the item, wherein the altered or added characteristics, either alone or in combination with the observed characteristics of the storage item, uniquely identify the storage item;
   generating a new virtual identification tag that uniquely identifies the storage item based on the additional or altered characteristics introduced by the user alone or in combination with the observed characteristics of the storage item;
   utilizing audio input to add and modify any information associated with the virtual identification tags about the storage item.

2. The method of claim 1, wherein the observed characteristics of at least a portion of the storage item comprise of at least one selected from the group consisting of its weight, position, size, shape, color, surface patterns.

3. The method of claim 2, wherein the placement of the storage item sensed by at least one of the sensors is used as one of the characteristics of the storage item for the purpose of differentiating from other items in the container and generating its virtual identification tag.

4. The method of claim 1, wherein the additional or altered characteristic comprises a marking added on the storage item.

5. The method of claim 4, wherein the marking added on the storage item consists of one or more shapes, texts, or machine-readable tags in one or more colors, or their combination.

6. The method of claim 1, wherein the plurality of sensors include at least one of the following sensors: a camera able to detect the shape, size, or a view of at least part of the storage item; weight sensors or pressure-sensitive mats to detect addition or removal of an item from a section of the container, a Light Detection and Ranging (LIDAR) sensor, a time of flight sensor, and a 3-D camera to measure the distance of movements near the access plane; an optical obstacle detector, passive infrared motion sensors (PIR), proximity sensors, light detector to detect movement near the access plane.

7. The method of claim 1, mapping the observed characteristics, including any user introduced added or altered characteristics, to one of the previously generating virtual identification tags based on the domain knowledge, history of patterns of movements, user feedback, or a combination thereof.

8. The method of claim 1, wherein the information associated with the virtual identification tag is voice programmable.

9. A system, comprising:
- a plurality of storage areas for storage of physical storage items;
- a plurality of sensors configured to: detect an event of adding to or removing from any one of the plurality of storage areas each of the plurality of physical storage items, and detect at least one characteristic of each of the plurality of physical storage items stored in the plurality of storage areas to uniquely identify each storage item; and
- one or more sensors to capture audio input and one or more actuators to produce audio output
- a processor configured to:
- determine whether the storage item is uniquely identifiable based on the characteristics observed of at least a portion of the storage item by one or more sensors in the container, and a plurality of other items in the container;
- when the storage item is uniquely identifiable, determine whether the observed characteristics, including added or altered characteristics by the user, can be mapped to one of the previously generated virtual identification tags;
- when it cannot be mapped to any previously generated virtual identification tag, generate a new virtual identifying tag that uniquely identifies the storage item; and
- when the storage item is not uniquely identifiable:
- prompt the user to alter the characteristics of the storage item or add characteristics to the item, wherein the altered or added characteristics, either alone or in combination with the observed characteristics of the storage item, uniquely identify the storage item;
- generate a new virtual identification tag that uniquely identifies the storage item based on the additional or altered characteristics introduced by the user alone or in combination with the observed characteristics of the storage item;
- utilize audio input to add and modify any information associated with the virtual identification tags about the storage item.

10. The system of claim 9, wherein the observed characteristics of at least a portion of the storage item comprise of at least one selected from the group consisting of its weight, position, size, shape, color, surface patterns.

11. The system of claim 9, wherein the additional or altered characteristic comprises a marking added on the storage item.

12. The system of claim 11, wherein the marking added on the storage item consists of one or more shapes, texts, or machine-readable tags in one or more colors, or their combination.

13. The system of claim 11, wherein markings are made by physical AIDC tags, adhesive labels, or marker pens according to the explicit instruction from the system from the pre-supplied set of labels, tags, or marker pens.

14. The system of claim 9, wherein the plurality of sensors include at least one of the following sensors: a camera able to detect the shape, size, or a view of at least part of the storage item; weight sensors or pressure-sensitive mats to detect addition or removal of an item from a section of the container, a Light Detection and Ranging (LIDAR) sensor, a time of flight sensor, and a 3-D camera to measure the distance of movements near the access plane; an optical obstacle detector, passive infrared motion sensors (PIR), proximity sensors, light detector to detect movement near the access plane.

15. The system of claim 9, wherein the placement of the storage item sensed by at least one of the sensors is used as one of the characteristics of the storage item for the purpose of differentiating from other items in the container and generating its virtual identification tag.

16. The system of claim 9, wherein mapping the observed characteristics, including any user introduced added or altered characteristics, to one of the previously generating virtual identification tags based on the domain knowledge, history of patterns of movements, user feedback, or a combination thereof.

17. The system of claim 9, wherein the information associated with the virtual identification tag is voice programmable.

18. The system of claim 9, wherein the observed characteristics and the additional or altered characteristic introduced by the user for generating a virtual identification tag are associated and stored as metadata with the virtual identification tag.

19. The system of claim 9, wherein one of the plurality of sensors is configured to detect when each storage item crosses the access plane and into which one of the plurality of storage areas the storage item is placed.

20. The system of claim 19, wherein the observed characteristics of at least a portion of the storage item is detected relative to other storage items in the one storage area.

* * * * *